US012600303B2

(12) United States Patent
Sowles

(10) Patent No.: US 12,600,303 B2
(45) Date of Patent: Apr. 14, 2026

(54) VEHICLE INTERIOR WALL PANEL AND WALL PANEL ASSEMBLY WITH DOOR STOPPER

(71) Applicant: Toyota Motor Engineering & Manufacturing North America, Inc., Plano, TX (US)

(72) Inventor: Samuel L Sowles, Tecumseh, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 418 days.

(21) Appl. No.: 18/324,455

(22) Filed: May 26, 2023

(65) Prior Publication Data

US 2024/0391390 A1    Nov. 28, 2024

(51) Int. Cl.
B60R 7/04 (2006.01)
B60R 13/02 (2006.01)

(52) U.S. Cl.
CPC ................ B60R 7/04 (2013.01); B60R 13/02 (2013.01); B60R 2013/0287 (2013.01)

(58) Field of Classification Search
CPC .... B60R 7/04; B60R 13/02; B60R 2013/0287
See application file for complete search history.

(56) References Cited

U.S. PATENT DOCUMENTS 8,276,863 B2    10/2012  Niwai et al.

FOREIGN PATENT DOCUMENTS

| CN | 1275801 | C | 9/2006 |
|----|---------|---|--------|
| JP | 2012076617 | A | 4/2012 |
| JP | 2019182186 | A | 10/2019 |
| KR | 20120048164 | A * | 5/2012 |
| KR | 101944304 | B1 | 2/2019 |

* cited by examiner

*Primary Examiner* — Lori Lyjak
(74) *Attorney, Agent, or Firm* — Christopher G. Darrow; Darrow Mustafa PC

(57) ABSTRACT

A wall panel structured to form at least a portion of an interior wall of a vehicle is provided. The wall panel includes a body, a storage compartment formed in the body, and at least one door stopper extending from the body. The door stopper(s) may help support the wall panel in an upright orientation when the wall panel is positioned on a resting surface. Also described is a wall panel assembly including the wall panel and a door rotatably coupled to the wall panel for closing the storage compartment. In the wall panel assembly, the door stopper(s) on the wall panel may prevent over-rotation of the door, when the wall panel is not installed in a vehicle.

9 Claims, 8 Drawing Sheets

VEHICLE INTERIOR WALL PANEL AND WALL PANEL ASSEMBLY WITH DOOR STOPPER

TECHNICAL FIELD

The embodiments disclosed herein relate to vehicle interiors and, more particularly, to a wall panel and wall panel assembly structured to be self-supporting in associated upright orientations when not installed in a vehicle, and also structured to prevent over-rotation of a wall panel door when not installed in a vehicle.

BACKGROUND

Wall panels may be provided for attachment to vehicle interior walls and doors. In some cases, such wall panels may have storage compartments formed therein. The storage compartments may be accessible to users from the vehicle interior to provide additional user-available storage space. Rotatable doors may be mounted on the wall panels to close off the storage compartments. A door may be rotatably mounted on the wall panel prior to installation of the wall panel into the vehicle, thereby producing a wall panel assembly suitable for installation.

Frequently, the most stable, space-efficient, and worker-accessible way for arranging the wall panels and wall panels assemblies for transportation and/or installation is to position them in upright orientations on a flat surface, such as a plant floor surface or dolly base. However, when positioned in upright orientations, the wall panels and wall panel assemblies are susceptible to tipping over, which disrupts the installation process and may damage the wall panel. Also, when a wall panel assembly is in an upright orientation, an unsecured door of the assembly may swing open. The weight of the door and/or contact between the door and another object when the door is open may cause the door to over-rotate past a fully-open position of the door. This over-rotation may damage the door and/or the connections between the door and the wall panel.

SUMMARY

In one aspect of the embodiments described herein, a wall panel structured to form at least a portion of an interior wall of a vehicle is provided. The wall panel includes a body and at least one door stopper extending from the body. The door stopper(s) may help support the wall panel in an upright orientation when the wall panel is positioned on a resting surface. In a wall panel assembly, the door stopper(s) may also prevent over-rotation of a wall panel door rotatably coupled to the wall panel, when the wall panel is not installed in a vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale. Additionally, for simplicity and clarity of illustration, and where appropriate, corresponding or analogous elements of different embodiments of the invention appearing in different figures may have similar reference numerals.

DETAILED DESCRIPTION

This disclosure relates to a wall panel structured for installation in a vehicle interior, to form at least a portion of an interior wall of the vehicle. The wall panel includes a body and at least one door stopper extending from the body. The wall panel may have a storage compartment formed therein. A wall panel assembly is also described, including the wall panel and a door rotatably attached to the wall panel to close the storage compartment. The door stopper(s) may help support the wall panel in an upright orientation when the wall panel is positioned on a resting surface. In a wall panel assembly, the door stopper(s) may help support the assembly in an upright position prior to installation of the assembly into the vehicle. The door stopper(s) may also prevent over-rotation of the wall panel door when the wall panel is not installed in a vehicle.

Figure 1:
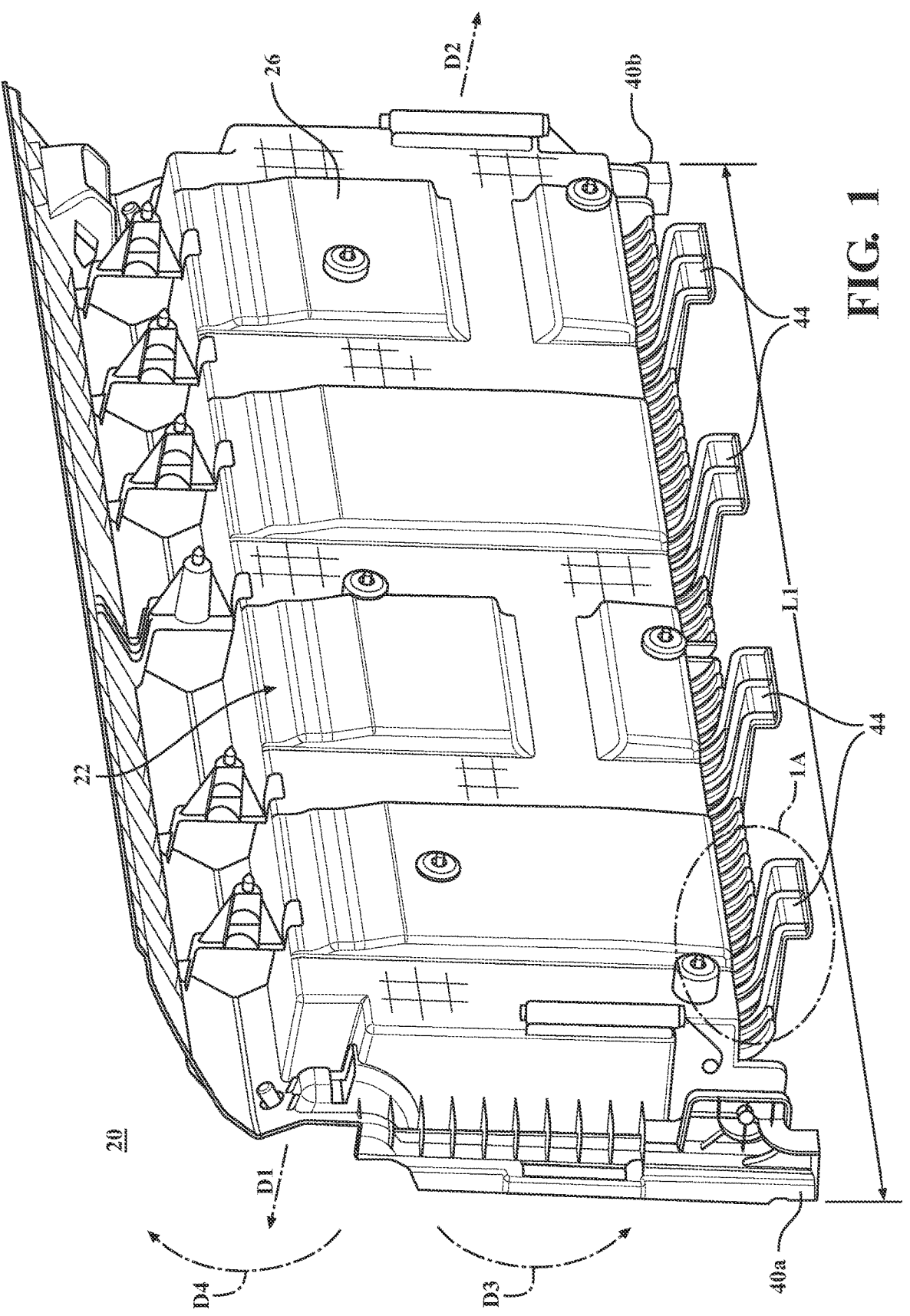
FIG. 1 is a schematic rear perspective view of a vehicle interior wall panel in accordance with an embodiment described herein.
Figure 2:
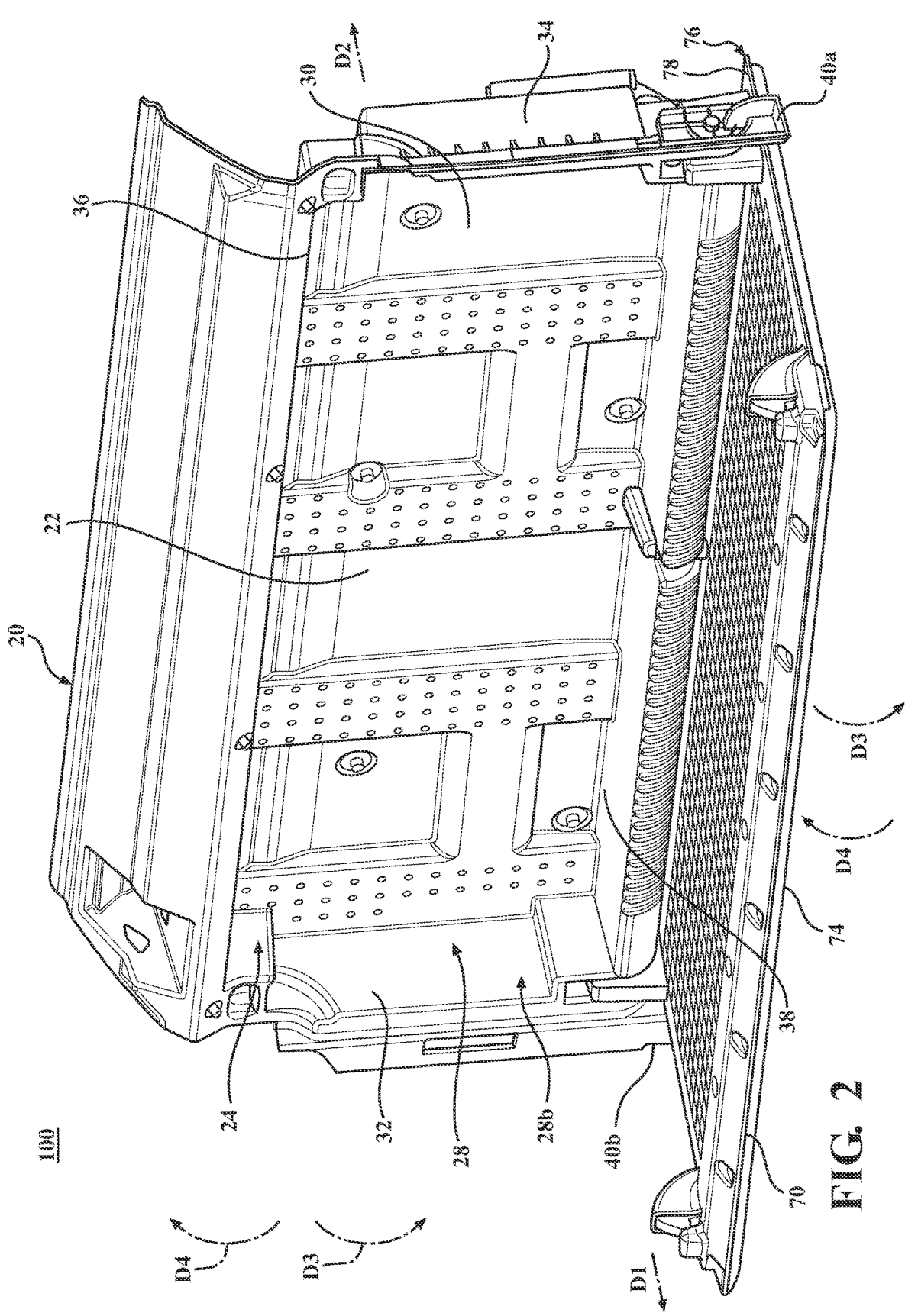
FIG. 2 is a schematic front perspective view of the wall panel shown in FIG. 1, showing a wall panel door rotatably coupled to the wall panel and in an open condition.

FIG. 1 is a schematic rear perspective view of a vehicle interior wall panel 20 in accordance with an embodiment described herein. FIG. 2 is a schematic front perspective view of the wall panel shown in FIG. 1, showing a wall panel door rotatably coupled to the wall panel and in an open condition. Referring to FIGS. 1 and 2, the wall panel 20 may be structured to be mountable to a wall in an interior of a vehicle (i.e., in an occupant compartment of the vehicle) (not shown). In particular arrangements, the wall may be an interior wall of a rear door of the vehicle. In one or more arrangements, the wall panel 20 may be molded using a suitable process. Alternative fabrication methods may also be used.

The wall panel 20 may have a body 22 including an inner side 24 and an outer side 26. The inner side 24 of the wall panel body 22 may be a side of the panel body structured to face in a direction D1 toward the vehicle occupant compartment when the wall panel 20 is installed in the vehicle. The inner side 24 of the body 22 may define a storage compartment or cavity 28 formed in the wall panel. The storage cavity 28 may have a cavity floor 30, a pair of opposed sidewalls 32 and 34, an upper wall 36, and a lower wall 38. The cavity sidewalls 32 and 34, the upper wall 36 and the lower wall 38 may define a cavity opening 28*b*.

The outer side 26 of the wall panel body 22 may be a side of the panel residing opposite the panel inner side 24 and outside the vehicle occupant compartment. The outer side 26 may be structured so as to face in a direction D2 away from the occupant compartment when the wall panel 20 is installed in the vehicle.

Figure 3:
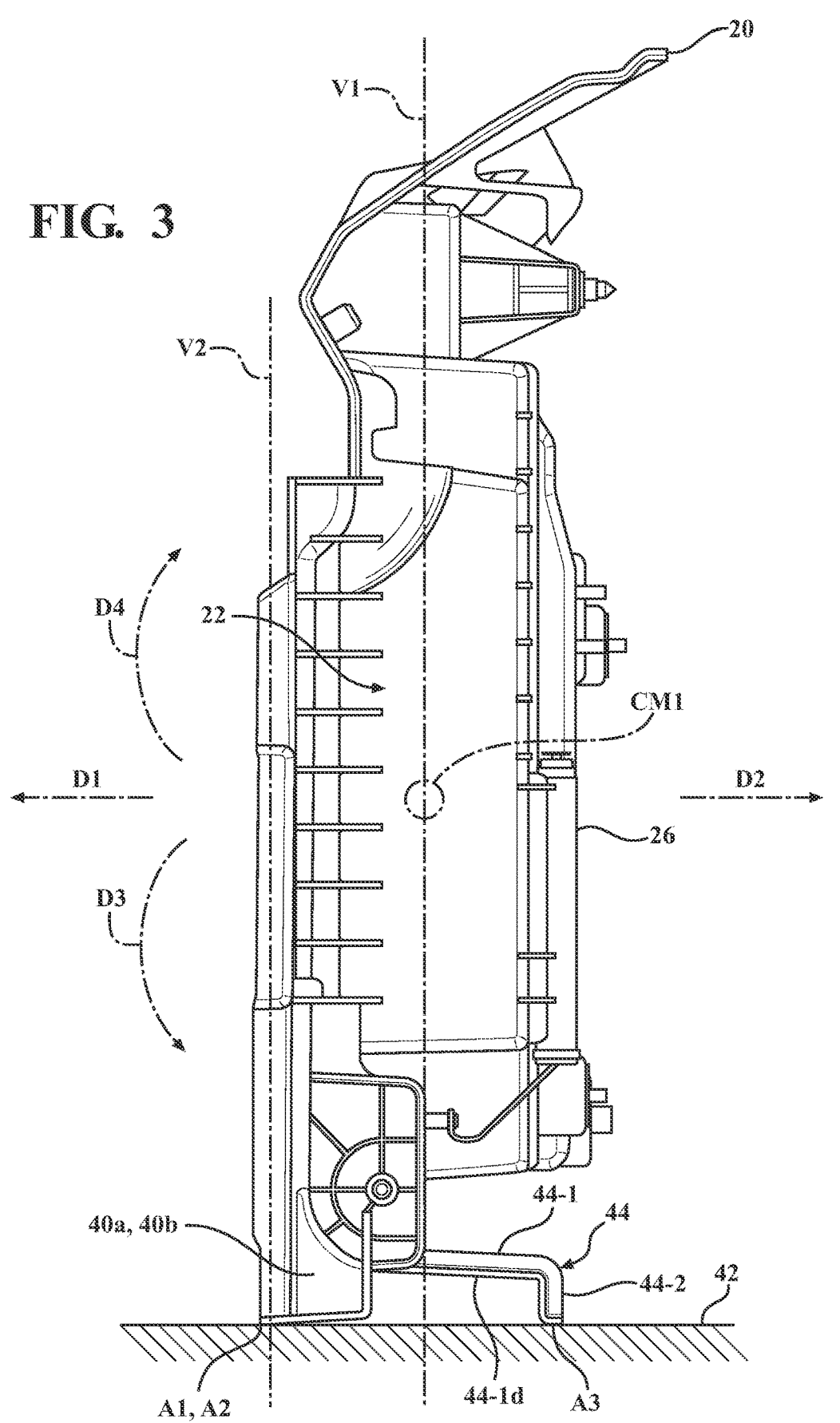
FIG. 3 is a schematic side view of a wall panel shown in FIG. 1, positioned in an upright orientation on a resting surface.

Referring to FIGS. 1-3, the wall panel 20 may also include at least one support projection 40 extending from the body 22. Support projection(s) 40 may be structured to contact a resting surface 42 (such as a flat ground or floor surface, or a platform of a transport dolly, for example) on which the wall panel 20 may be positioned when it is not installed in a vehicle. The support projection(s) 40 may be structured to contact the resting surface 42 to help support the wall panel 20 in an upright orientation of the wall panel. In particular arrangements, the wall panel 20 may include a pair of spaced-apart support projections 40*a* and 40*b* extending from the body 22. As seen in FIG. 1 for example, a support projection 40 may extend from the body 22 at or near each end of a length dimension L1 of the wall panel 20.

Figure 1A:
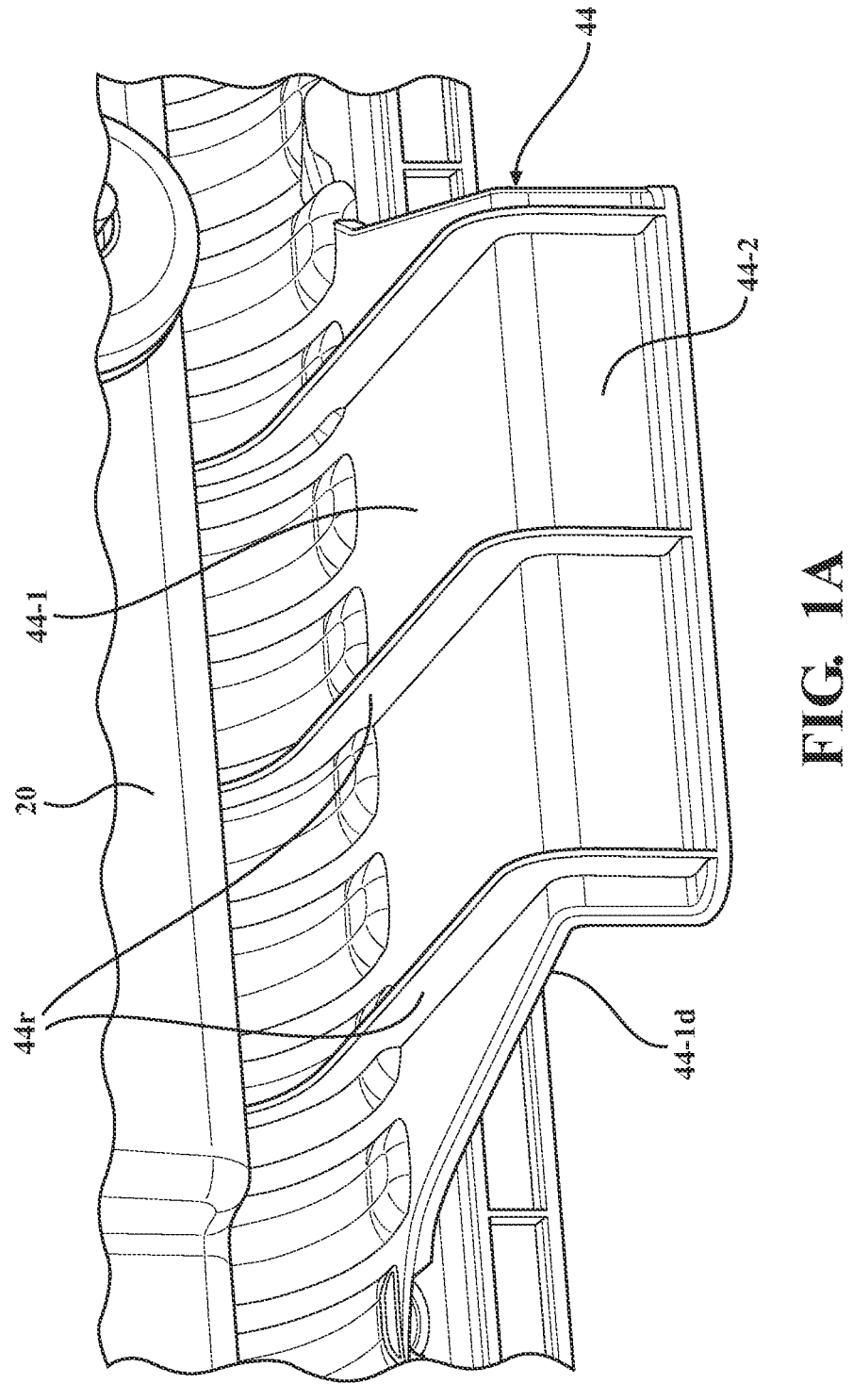
FIG. 1A is a magnified view of a portion of the wall panel of FIG. 1, showing details of an exemplary wall panel door stopper.

Referring to FIGS. 1, 1A, and 3, one or more door stoppers 44 may be formed into the wall panel body 22 (or formed separately and attached to the body) so as to extend from the body 22. FIG. 1A is a magnified view of a door stopper 44 extending from a body of the wall panel 20 shown in FIG. 1.

As described herein, the door stoppers 44 may be structured to control how far a wall panel door 70 (described in greater detail below) can rotate in a direction D3 from a fully-closed position of the door 70 to an open position. The door stopper(s) 44 may also be structured to operate in cooperation with the support projections 40 to support the wall panel 20 in an upright orientation of the wall panel on a horizontal or substantially horizontal resting surface 42 prior to installation of a wall panel assembly 100 (described in greater detail below) into a vehicle, and also prior to mounting of a door 70 to the wall panel 20. For example, FIGS. 1 and 6 show a plurality of similarly-structured wall panel door stoppers 44 extending from the wall panel body 22 and spaced apart along the length dimension L1 of the wall panel body 22, along the outer side 26 of the wall panel 20. the door 70 may be considered to be in the fully-closed position when the door is rotated as far as possible in direction D4, thereby closing the cavity opening 28*b* and preventing access to the cavity 28.

Referring to FIGS. 1-3, in one or more arrangements, each door stopper 44 may include a first portion 44-1 extending the same predetermined distance from the wall panel body 22. The door stopper first portion(s) 44-1 may extend generally in direction D2 away from the wall panel body outer side 26, from one or more surface(s) along the outer side. the door stopper first portion(s) 44-1 may be structured to be contacted by a stopper face 78 of a door bearing portion

76 (described in greater detail below) extending along the wall panel door 70, during rotation of the door when the door is rotatably mounted to the wall panel 20. Ribs 44*r* may be formed along outer surfaces of the door stoppers 44 to strengthen the door stoppers.

Figure 6:
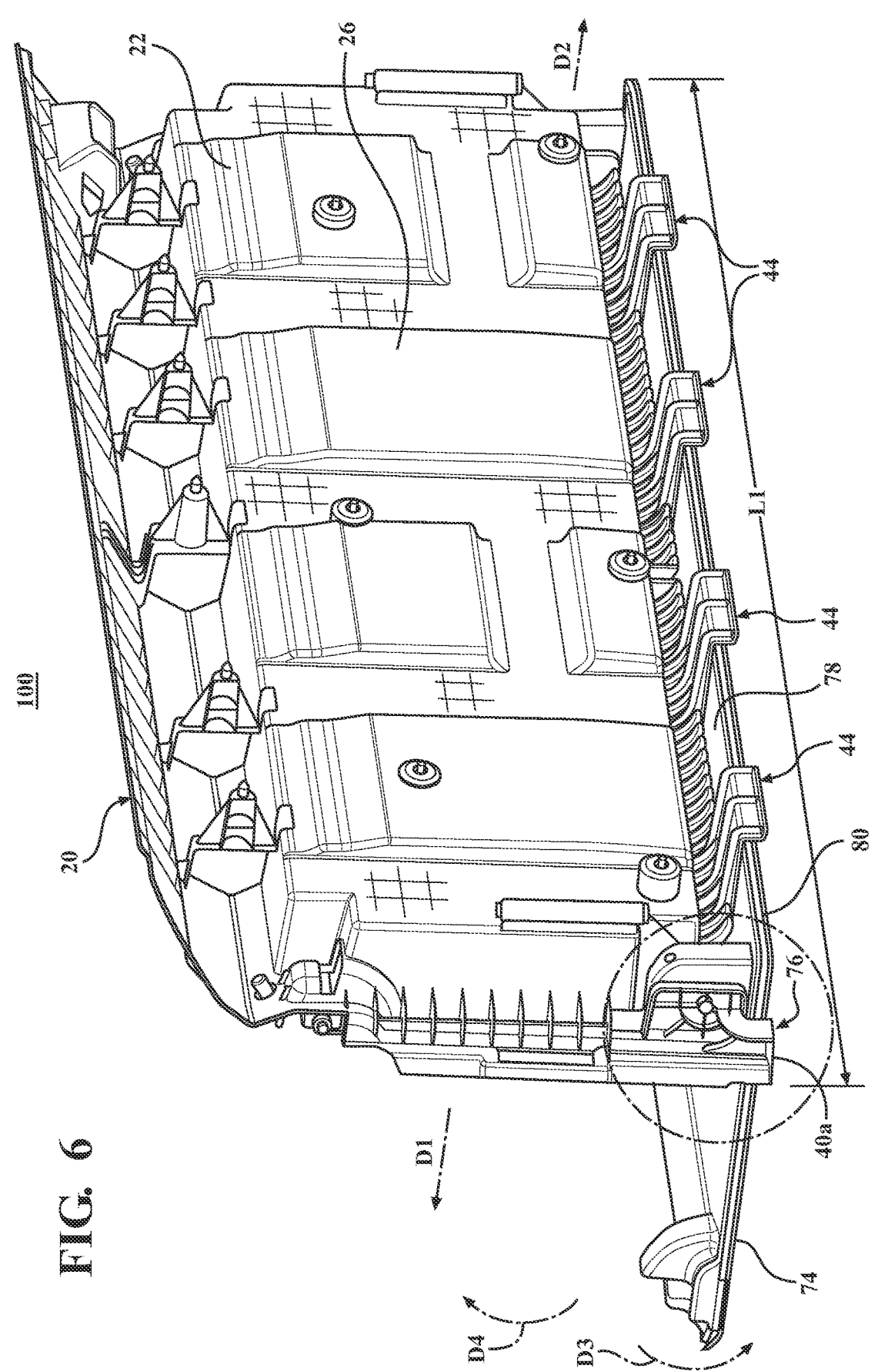
FIG. 6 is a schematic rear perspective view of the wall panel assembly of FIG. 5A, showing a door of the wall panel assembly in a fully-open position.
Figure 6A:
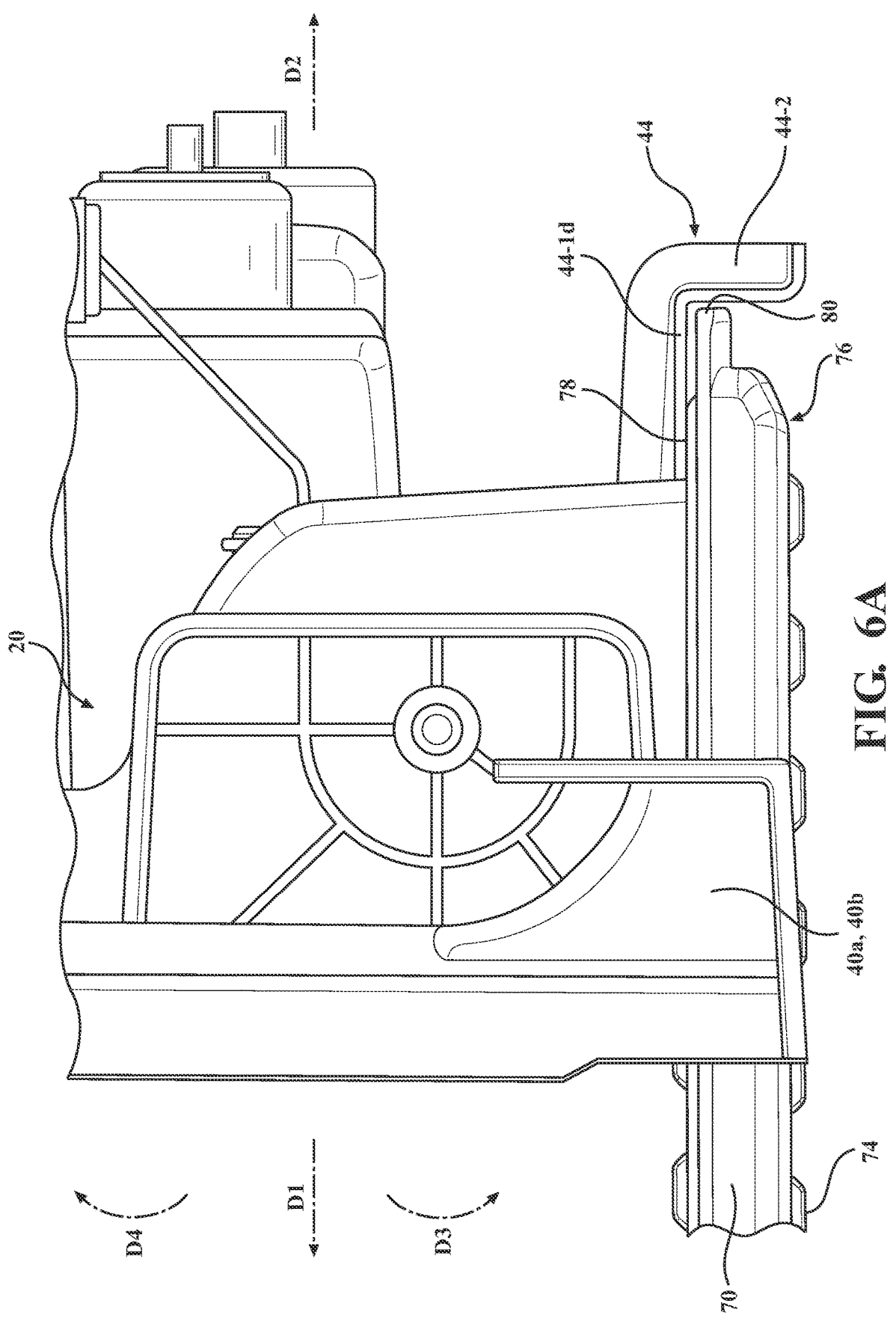
FIG. 6A is a magnified view of a portion of the wall panel assembly of FIG. 61, showing the door supported in the fully-open position against over-rotation by the door stoppers.

Each door stopper first portion may 44-1 have a bearing surface 44-1*d* structured to face in a direction toward a ground surface on which a vehicle resides when the wall panel 20 is installed in the vehicle. referring to FIGS. 6 and 6A, each door stopper 44 and its associated bearing surface 44-1*d* may be positioned so that a stopper face 78 of door bearing portion 76 will contact and bear against the bearing surface when the door 70 is rotated a predetermined mount in direction D3 to its fully-open position (shown in FIGS. 6 and 6A). This may prevent over-rotation of the door 70 in cases where the wall panel assembly 100 is not yet mounted in a vehicle. Over-rotation of the door 70 past the fully-open position of the door prior to installation of the wall panel assembly 100 into the vehicle may damage the door 70 and/or the connections between the door 70 and the wall panel 20.

In some arrangements, the door stopper bearing surface(s) 44-1*d* may be structured to extend along associated horizontal or substantially horizontal plane(s) when the wall panel 20 is supported on a resting surface by door stoppers 44 and support projections 40.

Referring again to FIG. 1A, each door stopper 44 may also include a second portion 44-2 extending from the first portion 44-1 and structured to contact a resting surface 42 on which the wall panel 20 is positioned, to (in cooperation with the support projection(s)) 40 support the wall panel 20 in an upright orientation of the wall panel when both the support projection(s) 40 and the door stopper second portion(s) 44-2 are in contact with the resting surface 42. For example, FIGS. 1 and 3 show the wall panel 20 supported by support projections 40*a* and 40*b* and door stoppers 44 while positioned on the resting surface 42. Other configurations of the door stoppers are possible, as long as the other configuration(s) help support the wall panel 20 in an upright orientation of the wall panel.

Figures 4, 5A:
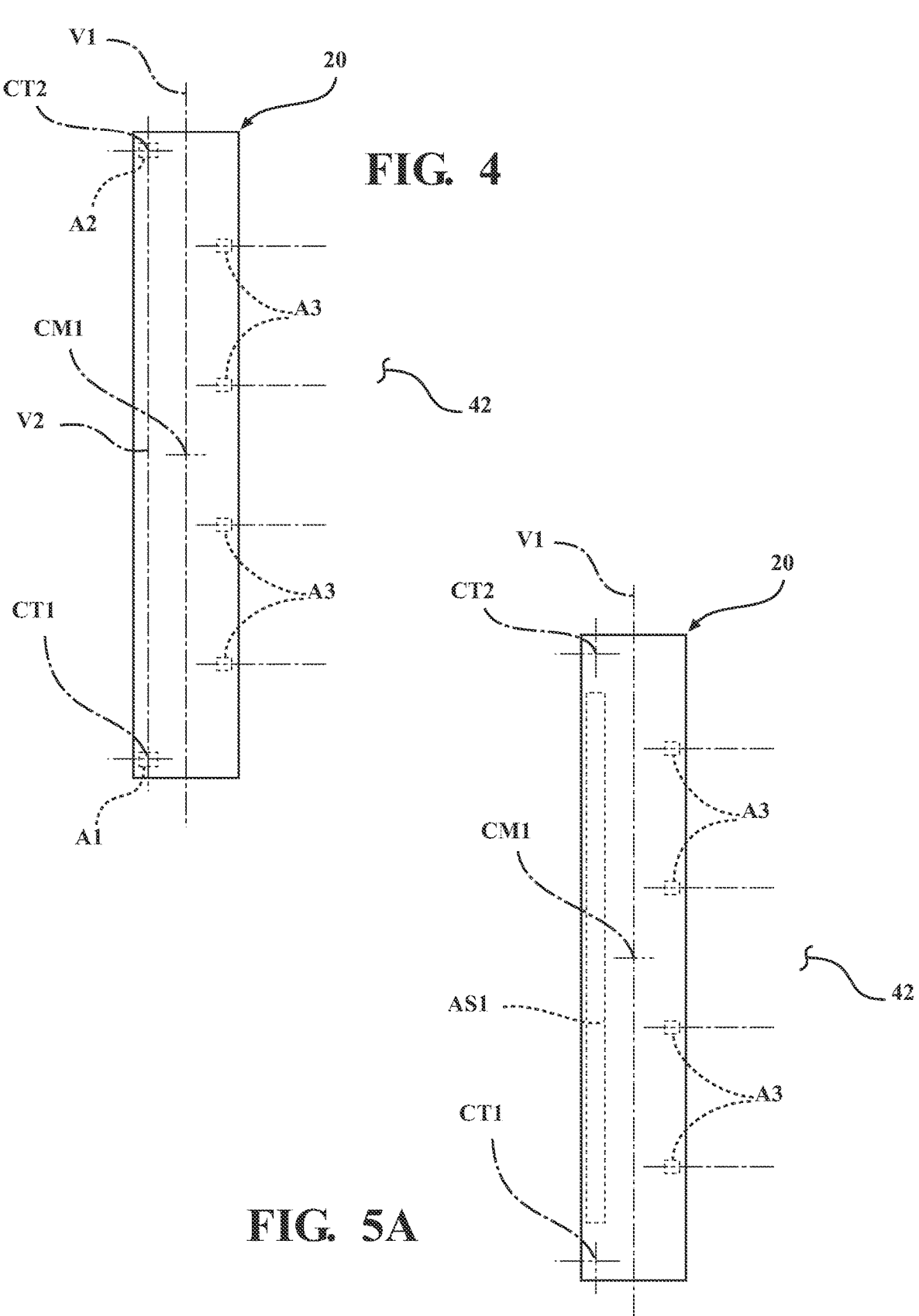
FIG. 4 is a schematic plan view of a wall panel positioned on a resting surface and illustrating relative locations of areas of contact between wall panel support projections and the resting surface, and between wall panel door stoppers and the resting surface.
FIG. 5A is a schematic plan view of a wall panel assembly positioned on a resting surface and illustrating relative locations of areas of contact between a wall panel door support edge the resting surface, and between wall panel door stoppers and the resting surface.

Referring to FIGS. 1-4, in arrangements where multiple support projections 40 are similarly configured and spaced apart from each other, the wall panel 20 may be structured so that, when the wall panel is supported in its upright orientation on the resting surface 42, a center of mass CM1 of the wall panel 20 resides along a vertical plane V1 extending parallel to another vertical plane V2 passing through centroids CT1, CT2 of first areas A1, A2 of contact of the support projections 40*a* and 40*b* with the resting surface 42. In addition, in such arrangements, the vertical plane V1 may be spaced apart from the first areas A1, A2 of contact of the support projections 40*a*, 40*b* with the resting surface 42. Also, in such arrangements, the vertical plane V1 may be spaced apart from second area(s) A3 of contact of the door stopper(s) 44 with the resting surface 42. Also, in such arrangements and as seen in FIG. 4, the vertical plane V1 may be positioned between the first areas of contact A1, A2 and the second area(s) of contact A3.

Structuring of the wall panel 20 as just described may facilitate support of the wall panel in the upright orientation of the wall panel on the resting surface 42. A wall panel structured as described herein may be considered to be positioned its an upright orientation when the panel is supported in a static (i.e., non-moving) condition by associated door stopper(s) and support projection(s) in contact with a horizontal or substantially horizontal resting surface (such as resting surface 42). For purposes described herein, a resting surface may be considered to be "substantially horizontal" when it varies less than 5° from a horizontal plane. The location(s) of the first area(s) of contact A1, A2 (between the support projection(s) 40 and the resting surface 42) with respect to the wall panel center of mass CM1, the location(s) of the second area(s) of contact A3 (between the door stopper(s) 44 and the resting surface 42) with respect to the wall panel center of mass CM1, and other pertinent characteristics may be specified so as to balance any force moments tending to rotate the wall panel 20 about the support projection contact area(s) A1, A2 and about the door stopper contact area(s) A3, thereby maintaining the wall panel 20 in the upright orientation when positioned on the resting surface 42.

Figure 5:
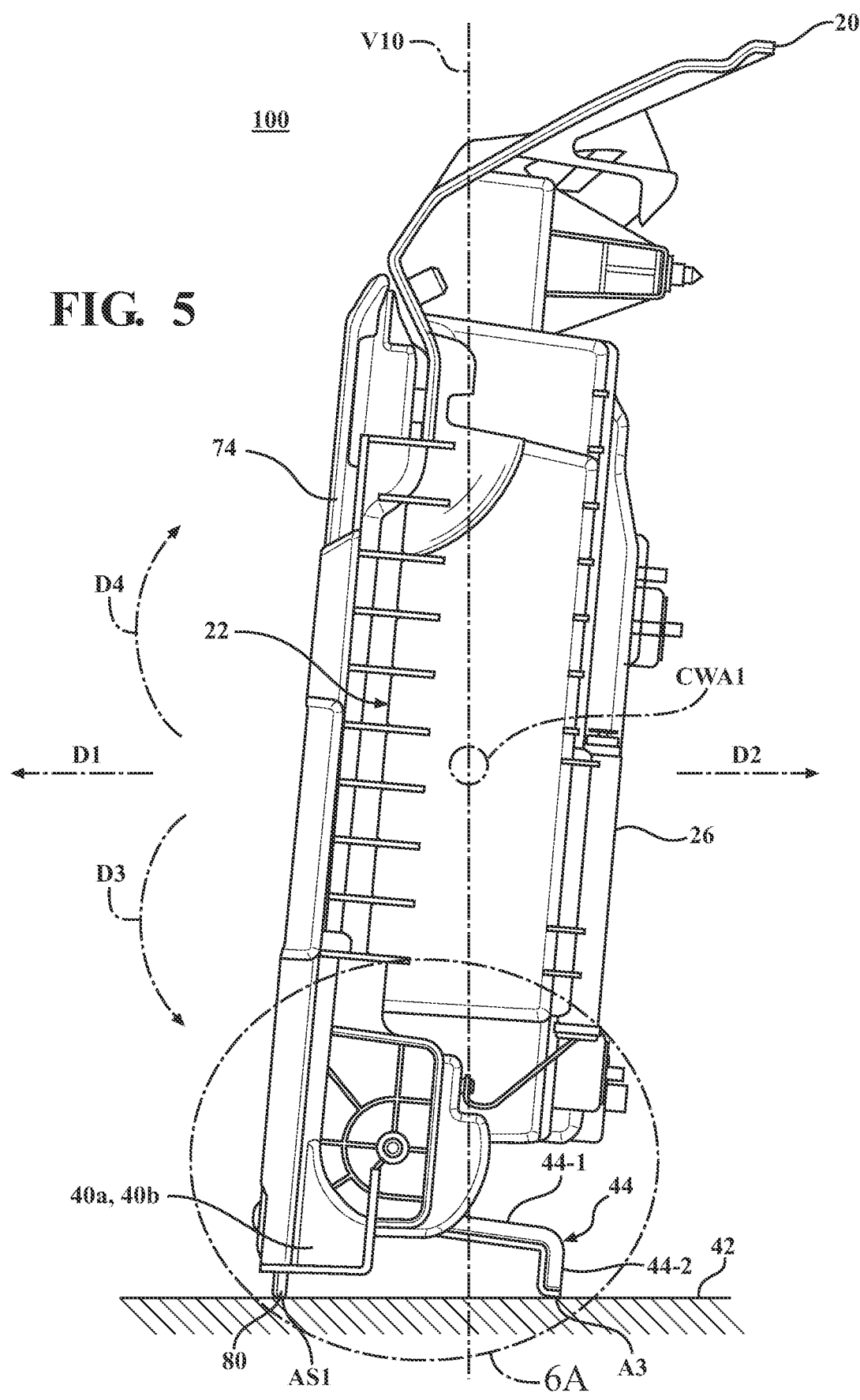
FIG. 5 is a schematic side view of a wall panel assembly incorporating a wall panel shown in FIG. 1, with the wall panel assembly positioned in an upright orientation on a resting surface.

Referring now to FIGS. 5-6A, a vehicle interior wall panel assembly 100 may be provided by attaching a door 70 to the wall panel 20. The wall panel assembly 100 may be installed in the vehicle along an interior wall. In one or more arrangements, the wall panel assembly 100 may include a wall panel 20 having a body 22 and at least one door stopper 44 extending from the body 22 as previously described herein. The assembly 100 may further include a wall panel door 70 rotatably coupled to the wall panel 20 and having a bearing portion 76 including a stopper face 78 and a support edge 80. The stopper face 78 may be structured to contact the door stopper first portions 44-1 to prevent further rotation of the door 70 in direction D3 when the door is in its fully-open position. The support edge 80 may be structured to support a portion of the wall panel assembly 100 in an upright orientation of the wall panel assembly as shown in FIG. 5 when the wall panel assembly 100 is positioned on the resting surface 42.

In particular arrangements, a fully-open position of the door 70 may be a condition where an outer surface 74 of the door 70 extends at an angle of 90°±5° with respect to a vertical plane when a wall panel assembly 100 incorporating the door 70 is installed in a vehicle. As used herein, the term "rotatably coupled" refers to the wall panel door 70 being connected to the wall panel 20 (either by direct physical contact or through an intermediate element) so as to be rotatable with respect to the wall panel, for purposes of opening the door 70 to enable access to wall panel compartment 28 and closing the door 70 to prevent access to the compartment.

For purposes of supporting the wall panel assembly 100 in an upright orientation of the assembly on a resting surface 42 when the assembly is not installed in a vehicle, in arrangements as shown in FIGS. 5-6A, the wall panel assembly 100 may be structured so that, when the assembly is supported in the upright orientation on the resting surface and with the door 70 is in a fully-closed position as shown in FIG. 5, a center of mass CWA1 of the wall panel assembly 100 resides along a vertical plane V10 spaced apart from an area of contact AS1 of the support edge 80 with the resting surface 42 when the door 70 is fully-closed. Also, in arrangements as shown in FIGS. 5-6A, the vertical plane V10 may be spaced apart from areas of contact A3 of the door stoppers 44 with the resting surface 42. Also, in arrangements as shown in FIGS. 5-6A, the vertical plane V10 may be positioned between the area of contact AS1 of the support edge 80 with the resting surface 42 and the area(s) of contact A3 of the door stoppers 44 with the resting surface 42.

Structuring of the wall panel assembly 100 as just described may facilitate support of the wall panel assembly in an upright orientation of the wall panel assembly on the resting surface 42. A wall panel assembly structured as described herein may be considered to be positioned in an upright orientation when the assembly is supported in a static (i.e., non-moving) condition by a support edge and door stopper(s) in contact with a horizontal or substantially horizontal resting surface.

Referring to FIGS. 5-6A, in operation, the door stopper(s) 44 may prevent over-rotation of the door 70 from the fully-closed position shown in FIG. 5 past the fully-open position of the door shown in FIGS. 6 and 6A, when the wall panel assembly 100 is not supported on a resting surface (for example, when the wall panel assembly 100 is supported on a rack for transport). Over-rotation may be prevented by the door stopper face 78 contacting and bearing against the door stopper bearing surface(s) 44-1d when the door 70 has reached the fully-open position.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A wall panel structured to form at least a portion of an interior wall of a vehicle, the wall panel comprising:
   a body; and
   at least one door stopper extending from the body,
   and wherein the at least one door stopper comprises:
   a first portion extending from the body; and
   a second portion extending from the first portion and structured to contact a resting surface when the wall panel is positioned on the resting surface and in an upright orientation of the wall panel.

2. The wall panel of claim 1, comprising a plurality of wall panel door stoppers extending from the body and spaced apart along a length dimension of the body.

3. A vehicle interior wall panel assembly including the wall panel in accordance with claim 1.

4. A wall panel structured to form at least a portion of an interior wall of a vehicle, the wall panel comprising:

a body;

at least one door stopper extending from the body; and at least one support projection extending from the body, wherein the at least one door stopper and the at least one support projection are structured to, in combination, support the wall panel in an upright orientation of the wall panel when the at least one door stopper and the at least one support projection are in contact with a resting surface.

5. The wall panel of claim 4, further comprising a pair of spaced-apart support projections extending from the body.

6. The wall panel of claim 5, wherein the wall panel is structured so that, when the wall panel is supported in the upright orientation on the resting surface:

a center of mass of the wall panel resides along a vertical plane extending parallel to another vertical plane passing through centroids of first areas of contact of the support projections with the resting surface;

the vertical plane is spaced apart from the first areas of contact of the support projections with the resting surface;

the vertical plane is spaced apart from second area(s) of contact of the at least one door stopper(s) with the resting surface; and the vertical plane is positioned between the first areas of contact and the second area(s) of contact.

7. A vehicle interior wall panel assembly comprising:

a wall panel having a body and at least one door stopper extending from the body; and a wall panel door rotatably coupled to the wall panel and including a stopper face structured to abut the at least one door stopper upon rotation of the door to a fully-open position of the door.

8. The wall panel assembly of claim 7, wherein the wall panel door includes a support edge structured to support a portion of the wall panel assembly in an upright orientation of the-wall panel assembly on a resting surface when the door is rotated to a fully-closed position of the door.

9. The wall panel assembly of claim 8, wherein the wall panel assembly is structured so that, when the wall panel assembly is supported in the upright orientation of the wall panel assembly with the door in a fully-closed position:

a center of mass of the wall panel assembly resides along a vertical plane spaced apart from an area of contact of the support edge with the resting surface;

the vertical plane is spaced apart from areas of contact of the door stoppers with the resting surface; and the vertical plane is positioned between the area of contact of the support edge with the resting surface and the areas of contact of the door stoppers and the resting surface.

* * * * *